US007698828B2

(12) United States Patent
Wei

(10) Patent No.: US 7,698,828 B2
(45) Date of Patent: Apr. 20, 2010

(54) SAFETY RULE

(76) Inventor: Shao-Tsung Wei, 4F., No. 1, Alley 2, Lane 242, Chung Cheng Rd., Yunghe city, Taipei Hsien (TW)

( * ) Notice: Subject to any disclaimer, the term of this patent is extended or adjusted under 35 U.S.C. 154(b) by 0 days.

(21) Appl. No.: 12/202,437

(22) Filed: Sep. 2, 2008

(65) Prior Publication Data

US 2010/0050452 A1 Mar. 4, 2010

(51) Int. Cl.
*G01B 3/06* (2006.01)
*B43L 7/00* (2006.01)

(52) U.S. Cl. ............................ 33/485; 33/481; 33/484; 33/492

(58) Field of Classification Search .................. 33/485, 33/465, 484, 490, 491, 492, 452, 454, 483, 33/481
See application file for complete search history.

(56) References Cited

U.S. PATENT DOCUMENTS 370,668 A * 9/1887 Westcott ...................... 33/485
470,754 A * 3/1892 Hartig ......................... 33/483
569,358 A * 10/1896 Sommerfeldt ................ 33/491
3,406,456 A * 10/1968 Schleich ...................... 33/492
5,471,755 A * 12/1995 Haskell ....................... 33/485
5,771,598 A * 6/1998 Lassberg ..................... 33/494
5,842,402 A * 12/1998 Collier ........................ 83/745
5,873,171 A * 2/1999 Hsu ............................ 33/484
6,349,479 B1 * 2/2002 Bottega ....................... 33/481
6,782,629 B2 * 8/2004 Jimenez et al. ............... 33/483
6,807,743 B2 * 10/2004 Odachowski ................ 33/465
7,254,899 B2 * 8/2007 Marocco et al. ............... 33/760

* cited by examiner

*Primary Examiner*—Christopher W Fulton
(74) *Attorney, Agent, or Firm*—Leong C. Lei

(57) ABSTRACT

A safety rule includes a rule body, which has a stop flange protruded from and extending along one long side thereof, a protective plate, which has one long side pivotally coupled to the rule body so that the protective plate can be set in a collapsed position and closely attached to the top surface of the rule body when the safety rule is not in use or lifted from the rule body to a lifted position for protecting the user's hand to avoid accidental hand injury when the safety rule is used to guide a cutter in cutting a sheet member.

4 Claims, 9 Drawing Sheets

SAFETY RULE

BACKGROUND OF THE INVENTION (a) Technical Field of the Invention

The present invention relates to a rule and more particularly, to a safety rule, which prevents hand injury when used to guide cutting of a cutting tool.

(b) Description of the Prior Art

Rule is a straight strip of wood, metal, etc., used to measure or as a guide in drawing or cutting. When using a cutter to cut a sheet material and a rule to guide the cutter in cutting the sheet material, the operator's hand may be injured by the cutting edge of the cutter accidentally. Therefore, it is desirable to provide a safety rule that prevents hand injury.

SUMMARY OF THE INVENTION

The primary purpose of the present invention is to provide a safety rule, which is equipped with a pivoted protective plate for protecting the user's hand to avoid accidental hand injury when the safety rule is used to guide a cutter in cutting a sheet member.

To achieve this and other objects and according to one embodiment of the present invention, the safety rule comprises a rule body and a protective plate. The rule body comprises a stop flange protruded from and extending along one long side thereof, a longitudinal coupling groove defining in the stop flange, and a recessed positioning portion defined in the longitudinal coupling groove. The protective plate comprises a cylindrical coupling rib formed integral with and extending along one long side thereof and coupled to the longitudinal coupling groove to pivotally secure the protective plate to the rule body for enabling the protective plate to be turned relative to the rule body between a collapsed position and a lifted position, and a positioning protrusion protruded from the periphery of the cylindrical coupling rib for engaging the recessed positioning portion to hold the protective plate in the lifted position.

According to an alternate form of the present invention, the safety rule is comprised of a rule body and a protective plate. The rule body comprises a stop flange protruded from and extending along one long side thereof, a cylindical coupling rib formed integral with the stop flange and extending along the length of the rule body, and a positioning protrusion protruded from the periphery of the cylindrical coupling rib. The protective plate comprises a longitudinal coupling groove extending along one long side thereof and pivotally coupled to the cylindrical coupling rib of the rule body, and a recessed positioning portion formed in the longitudinal coupling groove for engagement with the positioning protrusion to hold the protective plate in the lifted position.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
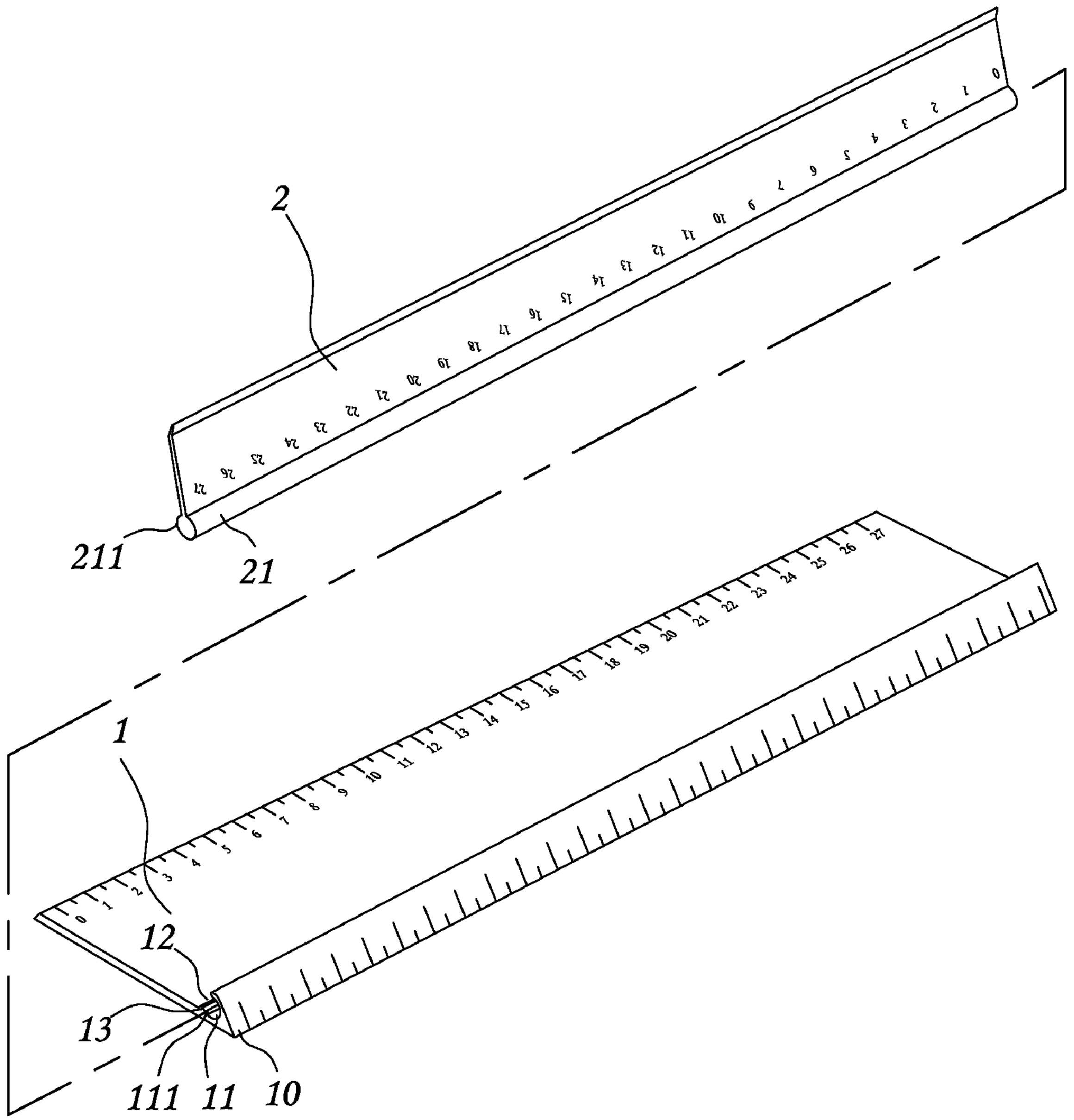
FIG. 1 is an exploded view of a safety rule in accordance with a first embodiment of the present invention.
Figure 2:
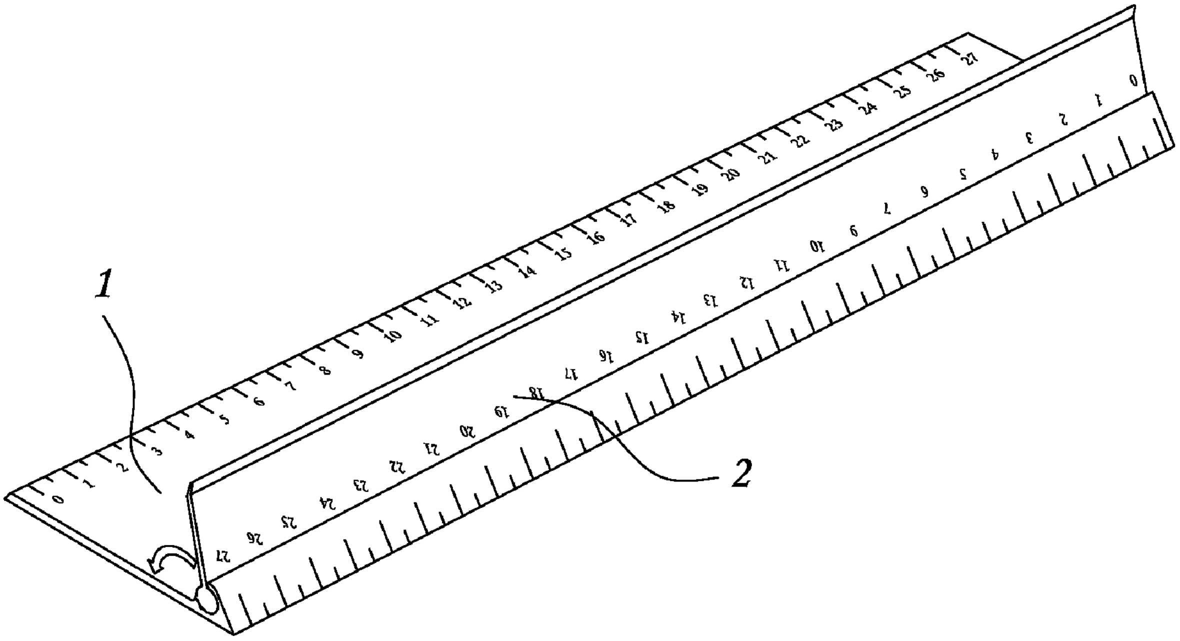
FIG. 2 is an elevational view of the safety rule in accordance with the first embodiment of the present invention, showing the protective plate set lifted to the lifted position.
Figure 3:
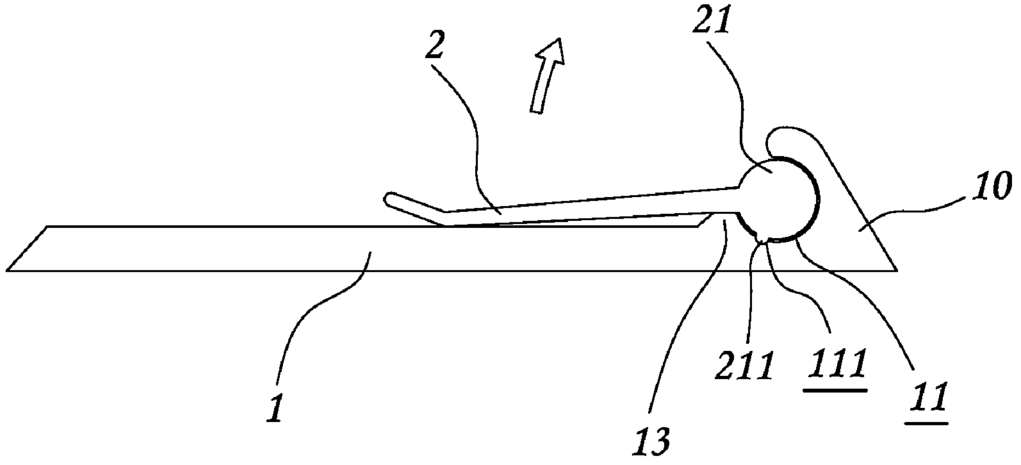
FIG. 3 is a schematic sectional end view of the safety rule in accordance with the first embodiment of the present invention, showing the protective plate set in the collapsed position.
Figure 4:
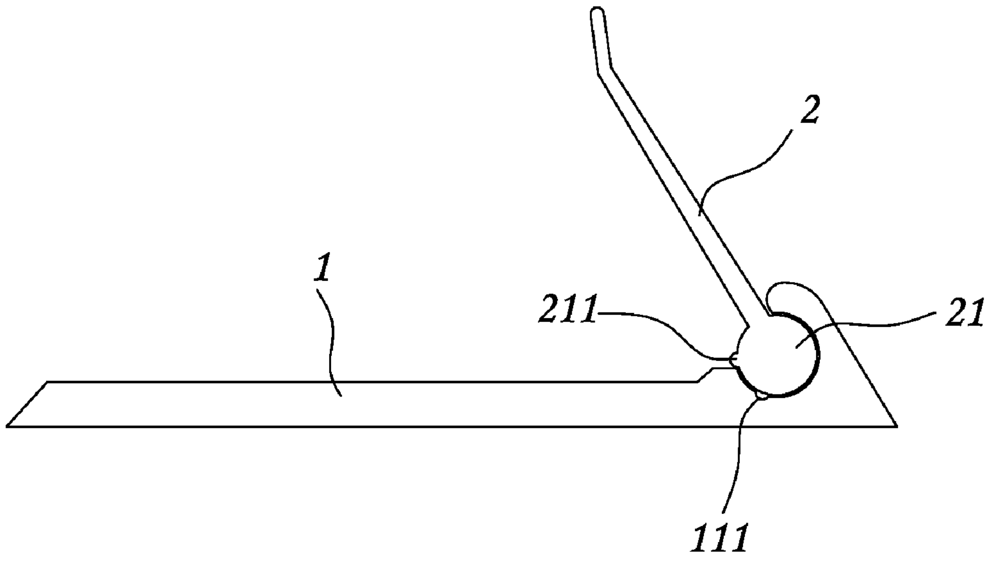
FIG. 4 corresponds to FIG. 3, showing the protective plate set in the lifted position.
Figure 5:
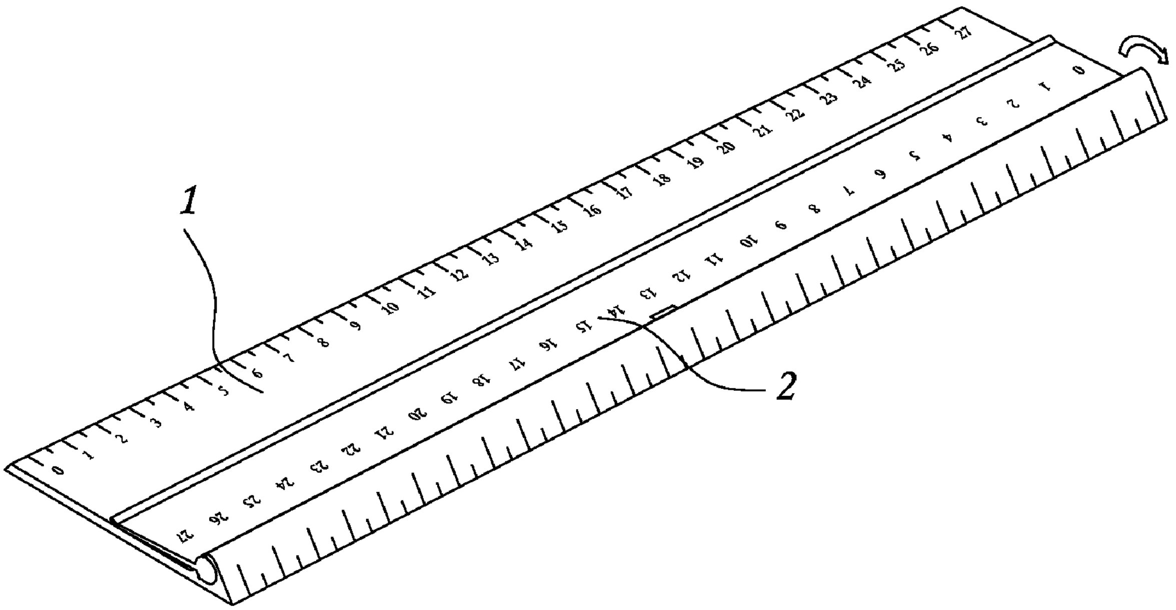
FIG. 5 is another elevational view of the first embodiment of the present invention, showing the protective plate set in the collapsed position.
Figure 6:
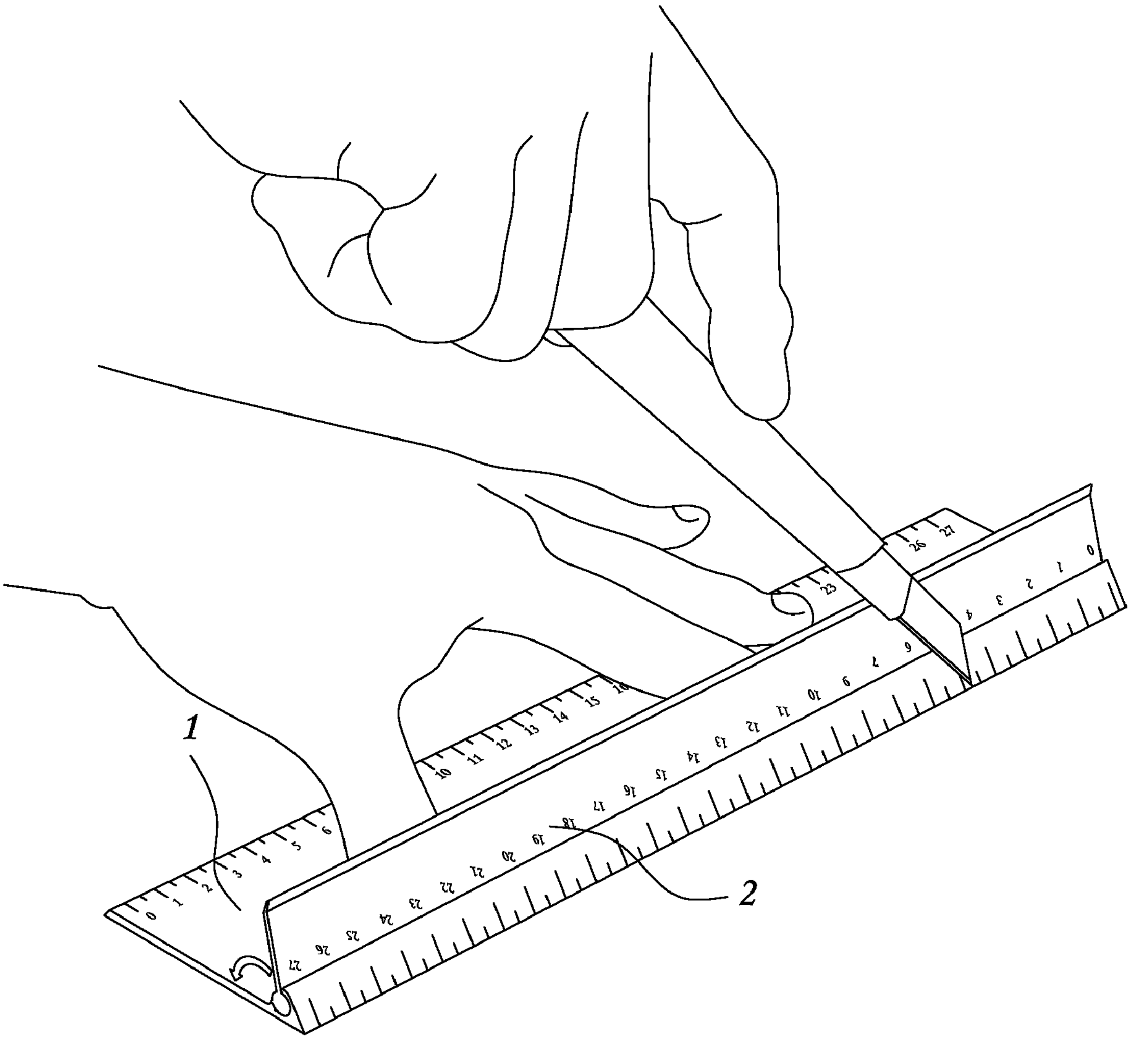
FIG. 6 is an applied view of the safety rule according to the first embodiment of the present invention.
Figure 7:
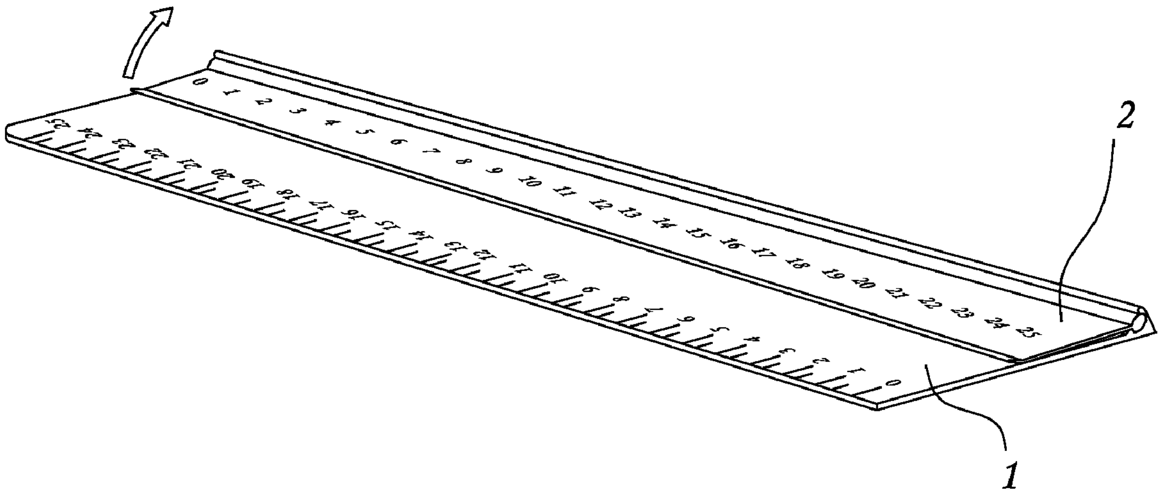
FIG. 7 corresponds to FIG. 5 when viewed from another angle.
Figure 8:
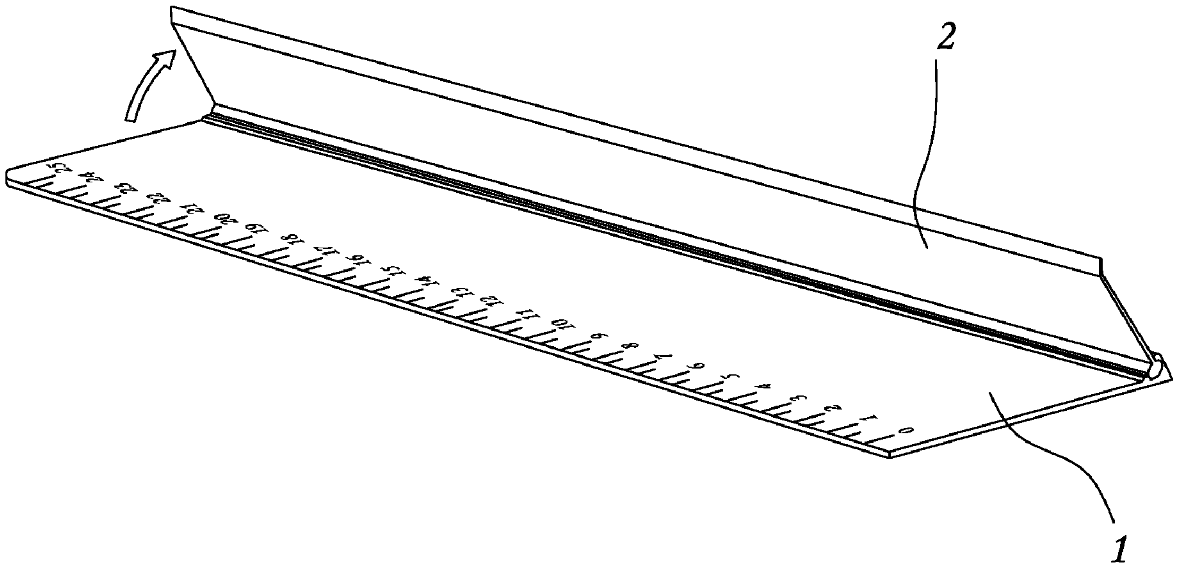
FIG. 8 corresponds to FIG. 2, when viewed from another angle.
Figure 9:
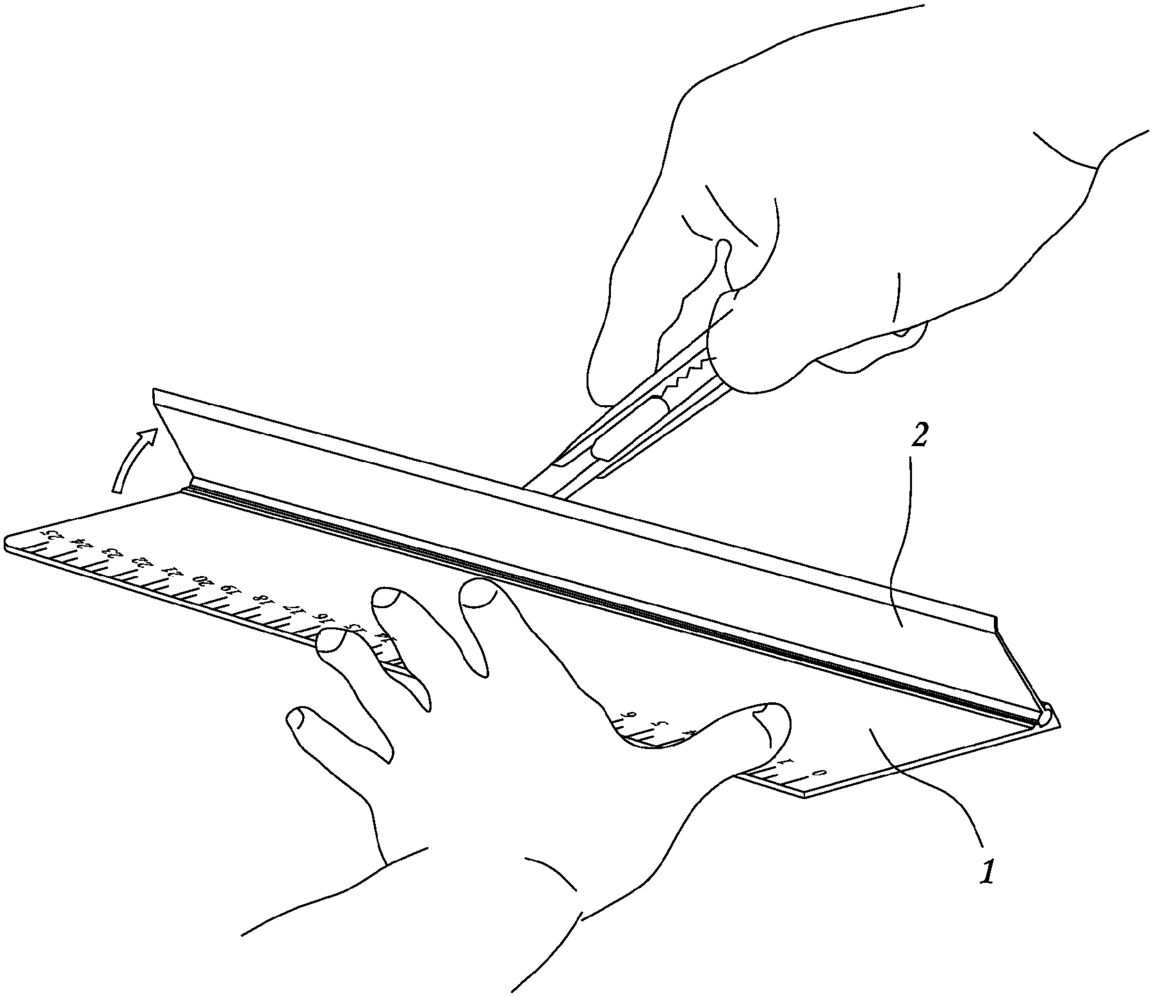
FIG. 9 is a schematic sectional end view of the third embodiment of the present invention, showing the protective plate in the collapsed position.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1~9, a safety rule in accordance with a first embodiment of the present invention is shown comprising a rule body 1 and a protective plate 2. The rule body 1 and the protective plate 2 are respectively made in a one-piece form. For example, the rule body 1 and the protective plate 2 can be respectively protruded from aluminum or injection-molded from plastics. The rule body 1 has a predetermined length, a first long side, a second long side opposing the first long side, a longitudinal stop flange 10 obliquely upwardly protruded from the first long side and extending along the length, a narrow elongated raised portion 13 protruded from the top wall of the rule body 1 and disposed adjacent to and in a parallel manner relative to the longitudinal stop flange 10, a longitudinal coupling groove 11 defined in between narrow elongated raised portion 13 and the longitudinal stop flange 3 and extending along the length of the rule body 1, and a recessed positioning portion 111 defined in the longitudinal coupling groove 11 and extending along the length of the longitudinal coupling groove 11. The longitudinal stop flange 3 may be marked with graduations for distance measurement. Further, the longitudinal coupling groove 11 has an open side 12 facing the second long side of the rule body 1.

The protective plate 2 is a an elongated flat strip member, having a cylindrical coupling rib 21 formed integral with one long side thereof and extending along the length for coupling to the longitudinal coupling groove 11 of the rule body 1, and a positioning protrusion 211 protruded from the periphery of the cylindrical coupling rib 21. The cylindrical coupling rib 21 is directly forced through the open side 12 into the longitudinal coupling groove 11 (see FIGS. 1 and 2) so that the protective plate 2 can be turned relative to the rule body 1 between a collapsed position where the protective plate 2 is closely attached to the top wall of the rule body 1 and the positioning protrusion 211 is forced into engagement with recessed positioning portion 111 (see FIGS. 3, 5 and 7) and a lifted position where the protective plate 2 is abutted against one side, namely, the top edge of open side 12 and the positioning protrusion 211 is stopped at the top side of the narrow elongated raised portion 13 to hold the protective plate 2 in the lifted position (see FIGS. 4 and 8). When the protective plate 2 is in the lifted position, a user must apply a downward biasing force to the protective plate 2 so that the protective plate 2 can be returned to the collapsed position.

Referring to FIGS. 6 and 9 again, when the safety rule of the first embodiment of the present invention is in use, lift the protective plate 2 to the lifted position, and then hold down the rule body 1 on the sheet to be cut with one hand, and then move the cutter along the longitudinal stop flange 10 with the other hand to cut the sheet. Because the protective plate 2 shields the hand that holds down the rule body 1, the user can cut the sheet safely, avoiding accidental hand injury.

Figure 10:
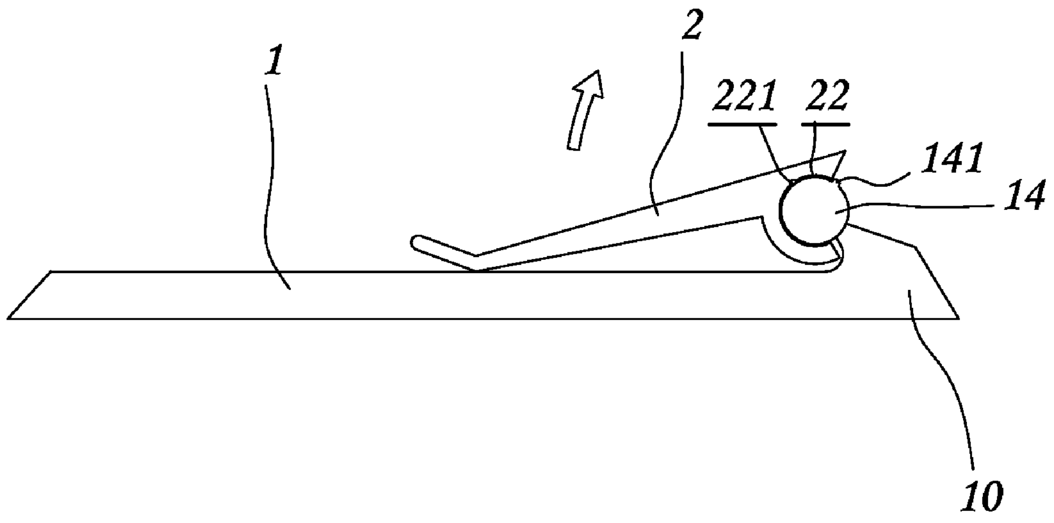
FIG. 10 is an end plain view of a safety rule in accordance with a second embodiment of the present invention, showing the protective plate in the collapsed position.
Figure 11:
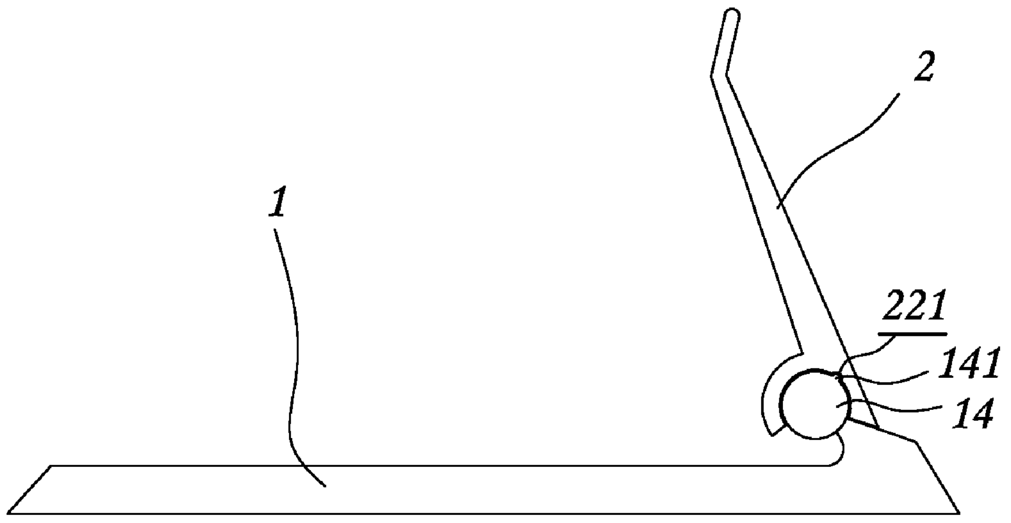
FIG. 11 corresponds to FIG. 10 but showing the protective plate set in the lifted position.

FIGS. 10 and 11 show a safety rule in accordance with a second embodiment of the present invention. Similar to the aforesaid first embodiment, the safety rule of this second embodiment is comprised of a rule body 1 and a protective plate 2. The rule body 1 of the safety rule according to this second embodiment has a first long side, a second long side opposing the first long side, a longitudinal stop flange 10 obliquely upwardly protruded from the first long side and extending along the length, a cylindrical coupling rib 14 formed integral with and extending along the longitudinal stop flange 10, and a longitudinal protrusion 141 protruded from the periphery of the cylindrical coupling rib 14. The protective plate 2 of the safety rule according to this second embodiment has a longitudinal coupling groove 22 extending along one long side thereof and pivotally coupled to the cylindrical coupling rib 14, and recessed positioning portion 221 formed in the longitudinal coupling groove 22 and extending along the length of the protective plate 2. After coupling between the longitudinal coupling groove 22 and the cylindrical coupling rib 14, the protective plate 2 can be turned relative to the rule body 1 between a collapsed position where the protective plate 2 is rested on the top wall of the rule body 1 (as shown in FIG. 10), and a lifted position wherein the recessed positioning portion 221 is forced into engagement with the longitudinal protrusion 141 to support the protective plate 2 in the lifted position (as shown in FIG. 11).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A safety rule comprising:

a rectangular rule body having two long sides and two short sides, said rectangular rule body having a stop flange protruded from and extending along one of said long sides, an elongated raised portion protruded from a top wall of said rule body and disposed adjacent to and in parallel relative to said longitudinal stop flange, a longitudinal coupling groove defined in between said elongated raised portion and said longitudinal stop flange and extending along a length of said rule body, said longitudinal coupling groove having an open side, and a recessed positioning portion defined in said longitudinal coupling groove; and a protective plate having a cylindrical coupling rib formed integral with and extending along one of said long sides of said rule body and forced through said open side into said longitudinal coupling groove to pivotally secure said protective plate to said rule body for enabling said protective plate to be turned relative to said rule body between a collapsed position and a lifted position, and a positioning protrusion protruded from a periphery of said cylindrical coupling rib for stopping at a top side of said elongated raised portion to hold said protective plate in a lifted position;

wherein said protective plate can be turned relative to said rule body between a collapsed position where said protective plate is closely attached to a top wall of said rule body and said positioning protrusion is forced into engagement with said recessed positioning portion and a lifted position where said protective plate is abutted against a top side of said elongated raised portion to hold said protective plate in said lifted position.

2. The safety rule as claimed in claim 1, wherein said protective plate has graduations marked thereon for distance measurement.

3. A safety rule comprising:

a rectangular rule body having two long sides and two short sides, said rectangular rule body having a stop flange protruded from and extending along one of said long sides, a cylindrical coupling rib formed integral with said stop flange and extending along a length of said rule body, and a positioning protrusion protruded from a periphery of said cylindrical coupling rib and extending along a length of said cylindrical coupling rib; and a protective plate having a longitudinal coupling groove coupled to said cylindrical coupling rib to pivotally secure said protective plate to said rule body for enabling said protective plate to be turned relative to said rule body between a collapsed position and a lifted position, and a recessed positioning portion defined in said longitudinal coupling groove for engaging said positioning protrusion to hold said protective plate in said lifted position;

wherein said protective plate can be turned relative to said rule body between a collapsed position where said protective plate is rested on a top wall of said rule body, and a lifted position wherein said recessed positioning portion is forced into engagement with said longitudinal protrusion to support said protective plate in said lifted position.

4. The safety rule as claimed in claim 3, wherein said protective plate has graduations marked thereon for distance measurement.

* * * * *